United States Patent
Duka et al.

(10) Patent No.: US 11,625,894 B2
(45) Date of Patent: Apr. 11, 2023

(54) VIRTUAL PHOTOGRAMMETRY

(71) Applicant: NVIDIA Corporation, Santa Clara, CA (US)

(72) Inventors: Dmitry Duka, Zhukovsky (RU); Rev Lebaredian, Los Gatos, CA (US); Jonathan Small, Charlottesville, VA (US); Ivan Shutov, Zalegosch (RU)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/204,169

(22) Filed: Mar. 17, 2021

(65) Prior Publication Data

US 2021/0201576 A1    Jul. 1, 2021

Related U.S. Application Data (63) Continuation of application No. 16/434,972, filed on Jun. 7, 2019, now Pat. No. 10,984,587.

(51) Int. Cl.
*G06T 17/20* (2006.01)
*G06T 15/50* (2011.01)
(Continued)

(52) U.S. Cl.
CPC ............ *G06T 17/20* (2013.01); *A63F 13/525* (2014.09); *G06T 15/20* (2013.01); *G06T 15/50* (2013.01);
(Continued)

(58) Field of Classification Search
CPC ........ A63F 13/52; A63F 13/525; A63F 13/85; G01C 11/00; G06T 17/20; G06T 15/50; G06T 2200/24
See application file for complete search history.

(56) References Cited

U.S. PATENT DOCUMENTS 6,009,188 A * 12/1999 Cohen ................. G06T 15/06
382/300
6,208,347 B1 * 3/2001 Migdal .................. G06T 17/20
345/419
(Continued)

FOREIGN PATENT DOCUMENTS

CN      101208723 A    6/2008
CN      103578132 A    2/2014
(Continued)

OTHER PUBLICATIONS

Aittala, M., et al., "Two-shot SVBRDF capture for stationary materials", ACM Trnnsaction on Graphics, vol. 34, No. 4. Article 110, pp. 110:1-110:4 (Aug. 2015).
(Continued)

*Primary Examiner* — Chase E Leichliter
(74) *Attorney, Agent, or Firm* — Taylor English Duma L.L.P.

(57) ABSTRACT

Multiple snapshots of a scene are captured within an executing application (e.g., a video game). When each snapshot is captured, associated color values per pixel and a distance or depth value z per pixel are stored. The depth information from the snapshots is accessed, and a point cloud representing the depth information is constructed. A mesh structure is constructed from the point cloud. The light field(s) on the surface(s) of the mesh structure are calculated. A surface light field is represented as a texture. A renderer uses the surface light field with geometry information to reproduce the scene captured in the snapshots. The reproduced scene can be manipulated and viewed from different perspectives.

20 Claims, 4 Drawing Sheets

Related U.S. Application Data (60) Provisional application No. 62/697,934, filed on Jul. 13, 2018.

(51) Int. Cl.
*A63F 13/525* (2014.01)
*G06T 15/20* (2011.01)

(52) U.S. Cl.
CPC ...... *G06T 2200/24* (2013.01); *G06T 2210/56* (2013.01)

(56) References Cited

U.S. PATENT DOCUMENTS

| | | | | |
|---|---|---|---|---|
| 8,319,825 | B1* | 11/2012 | Urbach | H04N 19/597 348/42 |
| 9,466,143 | B1* | 10/2016 | Walvoord | G06T 19/003 |
| 11,043,026 | B1* | 6/2021 | Fathi | G06N 20/00 |
| 2004/0109004 | A1 | 6/2004 | Bastos et al. | |
| 2008/0246836 | A1* | 10/2008 | Lowe | G06T 15/205 348/E13.02 |
| 2008/0259073 | A1* | 10/2008 | Lowe | H04N 13/275 348/E13.022 |
| 2009/0141966 | A1 | 6/2009 | Chen et al. | |
| 2010/0091018 | A1* | 4/2010 | Tatarchuk | G06T 15/005 345/473 |
| 2010/0141666 | A1* | 6/2010 | Christopher | G06T 9/001 345/520 |
| 2011/0012901 | A1* | 1/2011 | Kaplanyan | G06T 15/506 345/426 |
| 2011/0151971 | A1* | 6/2011 | Altshuler | A63F 13/497 463/30 |
| 2011/0169914 | A1* | 7/2011 | Lowe | G06T 15/20 348/E13.064 |
| 2011/0222757 | A1 | 9/2011 | Yeatman, Jr. et al. | |
| 2012/0021827 | A1* | 1/2012 | Raitt | A63F 13/5255 463/31 |
| 2012/0021828 | A1* | 1/2012 | Raitt | A63F 13/497 463/31 |
| 2012/0028706 | A1* | 2/2012 | Raitt | A63F 13/12 463/31 |
| 2012/0028707 | A1* | 2/2012 | Raitt | A63F 13/63 463/31 |
| 2014/0327674 | A1 | 11/2014 | Sorkine-Homung et al. | |
| 2016/0171765 | A1* | 6/2016 | Mehr | G06T 17/20 345/419 |
| 2016/0259866 | A1* | 9/2016 | Bigos | G06T 17/20 |
| 2017/0154462 | A1* | 6/2017 | von Cramon | G06V 10/60 |
| 2017/0154463 | A1* | 6/2017 | von Cramon | G06T 7/586 |
| 2017/0155852 | A1* | 6/2017 | von Cramon | H04N 5/2256 |
| 2017/0193699 | A1* | 7/2017 | Mehr | G06T 17/205 |
| 2019/0270251 | A1* | 9/2019 | Nagai | A63F 13/85 |
| 2020/0005138 | A1* | 1/2020 | Wedig | G06N 3/0481 |
| 2020/0122405 | A1* | 4/2020 | Bigos | G06T 19/20 |
| 2020/0122406 | A1* | 4/2020 | Bigos | B33Y 50/02 |
| 2021/0209777 | A1* | 7/2021 | Zhao | H04N 21/234 |

FOREIGN PATENT DOCUMENTS

| | | |
|---|---|---|
| CN | 105074615 A | 11/2015 |
| CN | 105791881 A | 7/2016 |
| CN | 105825544 A | 8/2016 |
| WO | 2008107783 A2 | 9/2008 |
| WO | 2017027638 A1 | 2/2017 |

OTHER PUBLICATIONS

Gautron, P., et al., "A Novel Hemispherical Basis for Accurate and Efficient Rendering", Eurographics Symposium on Rendering, pp. 321-330 (2004).

Liu, S., et al., "Multi-level hermite variational interpolation and quasi-interpolation", Visual Computer, vol. 29, pp. 627-637 (Apr. 20, 2013).

Duka, Dmitry; First Office Action for Chinese Patent Application No. 201910634628.X, filed Jul. 15, 2019, dated Jan. 20, 2023; 8 pgs.

* cited by examiner

202
GENERATE A POLYGON CENTERED AROUND EACH POINT IN A POINT CLOUD

204
CUT THE POLYGON AGAINST A NEIGHBOR POINT

206
TRIANGULATE EACH RESULTING POLYGON

302
IDENTIFY BORDER EDGES OF TRIANGLES IN A MESH STRUCTURE

304
FORM BORDER EDGES INTO LOOPS

306
TRIANGULATE THE LOOPS

VIRTUAL PHOTOGRAMMETRY

RELATED U.S. APPLICATION

This application claims the benefit of and priority to U.S. Provisional Application No. 62/697,934, titled "Virtual Photogrammetry," filed on Jul. 13, 2018, and this application is a continuation to U.S. patent application Ser. No. 16/434,972, entitled "Virtual Photogrammetry," filed Jun. 7, 2019. Each of these applications is incorporated herein by reference in its entirety.

BACKGROUND

In-game photography is a relatively new art form in which screenshots from video games, for example, are posed and framed just as a real-world photographer might. Nvidia Ansel is an example of an in-game camera feature that lets users take professional-grade photographs of scenes in games.

SUMMARY

In real-world photogrammetry, multiple photos of an object are taken from different angles, and those photos can be used to create a virtual three-dimensional (3D) version of the object that can be manipulated and viewed from different perspectives. In virtual photogrammetry, a virtual camera (provided by Nvidia Ansel, for example) instead of a real camera is controlled by a user to take screenshots, and those screenshots are then operated on. Essentially, photos are taken inside a virtual world, such as a video game.

Disclosed are methods, systems, and techniques for implementing virtual photogrammetry.

In embodiments according to the present invention, snapshots (screenshots) of a scene are captured within the executing application (e.g., a video game). While the snapshots are being captured, the virtual world can be paused (frozen in place) so that snapshots can be captured from different perspectives. When each snapshot is captured, associated color values (e.g., red, green, and blue values) per pixel and a distance value z per pixel (the distance from the virtual camera to the pixel) are stored. From the snapshots, a point cloud representing depth information can be constructed. A mesh structure can then be constructed from the point cloud. The light field(s) on the surface(s) of the mesh structure can then be calculated. In an embodiment, a light field is calculated using spherical harmonics as the compression mechanism.

In an embodiment, a surface light field can be represented as a texture. A renderer can use the surface light field with geometry information to reproduce, in virtual 3D, the scene captured in the snapshots. The reproduced scene can be manipulated and viewed from different perspectives. In essence, a virtual 3D snapshot is produced from multiple snapshots.

The 3D snapshots can be advantageously used in different ways. Use cases include, but are not limited to: enabling 360-degree stereo with positional tracking; sharing a scene (e.g., sharing a static piece of a game in a social networking application); importing a scene into another application; using a scene as source material in another application; creating a dataset (library) of virtual objects that can be used in different applications; and 3D printing.

Virtual photogrammetry in embodiments according to the invention provide a platform that enables less-experienced users, as well as experienced professionals such as video game designers, to readily create and share content.

These and other objects and advantages of the various embodiments according to the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "calculating," "(sub)dividing," "meshing," "(un)projecting," "cutting," "triangulating," "saving," "storing," "converting," "rendering," "sampling," "(re)triangulating," "encoding," "determining," "storing," "multiplying," "dividing," "querying," "representing," "producing," "testing," "clipping," "transforming," "mipmapping," "casting," "constructing," "reproducing," "capturing," "pausing," "calculating," "accessing," "computing," "generating," "copying," or the like, refer to actions and processes of an apparatus or computer system or similar electronic computing device or processor. A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., a solid-state drive) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
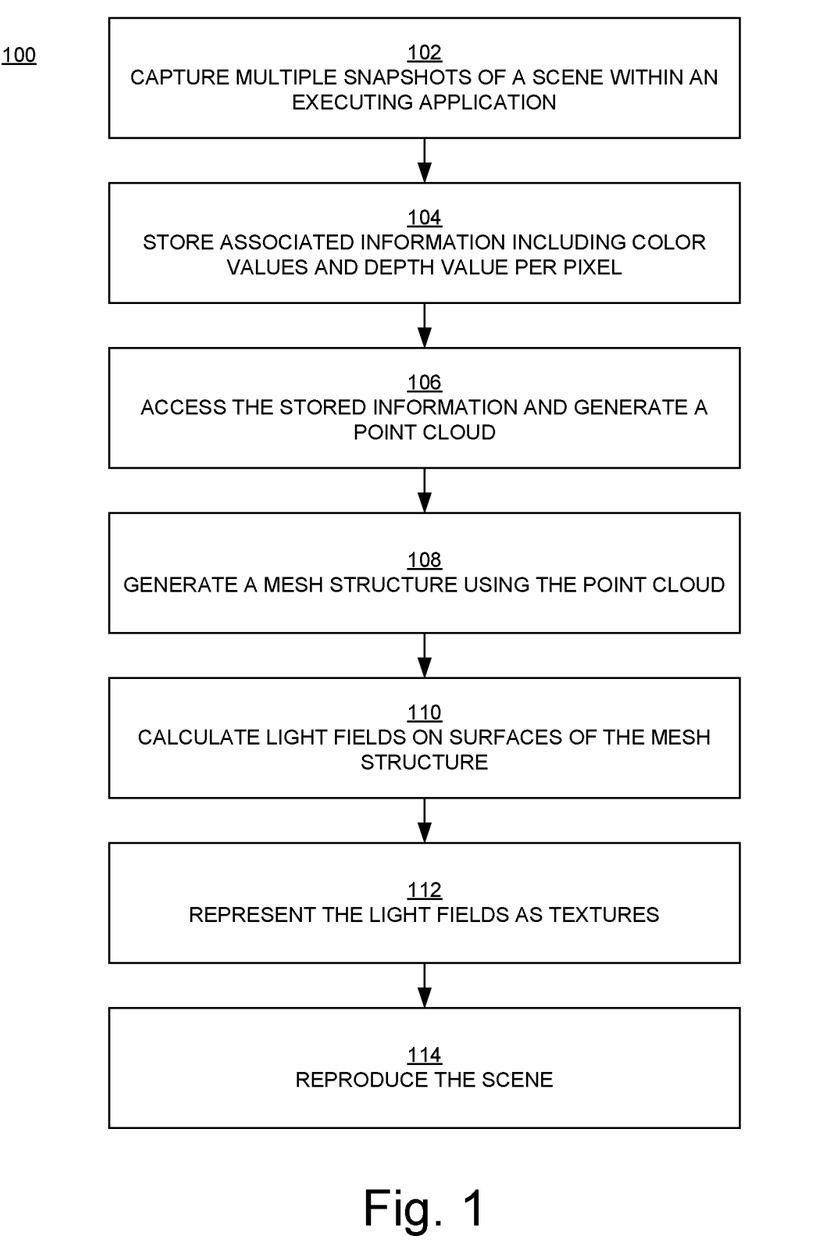
FIG. 1 is a flowchart of an example of a virtual photogrammetry method in embodiments according to the invention.

FIG. 1 is a flowchart 100 of an example of a virtual photogrammetry method in embodiments according to the invention. The flowchart 100 can be implemented as computer-executable instructions residing on some form of computer-readable storage medium (e.g., in memory of the computer system 500 of FIG. 5).

In block 102 of FIG. 1, multiple snapshots (screenshots; e.g., depth and color image captures) of a scene are captured within an executing application (e.g., a video game). While the snapshots are being captured, the virtual world can be paused (frozen in place) so that snapshots can be captured from different perspectives.

Although snapshots are captured from different perspectives in order to capture the scene, the scene does not need to be captured from all directions (angles). For example, it is not necessary to capture the scene from all directions if the intent is to view or reconstruct the scene from only a specific angle or set of angles. Thus, in an embodiment, only a snapshot at the intended viewing angle and snapshots at selected angles near/around the intended viewing angle are captured.

In an embodiment, snapshots are captured in response to a user input (in other words, snapshots are captured manually). In an embodiment, snapshots are captured automatically. A combination of manual and automatic operations can be used to capture snapshots.

In block 104, when each snapshot is captured, associated color values (e.g., red, green, blue (RGB) values) per pixel and a distance or depth value z per pixel (the distance from the virtual camera to the pixel) are stored.

In block 106, the depth information from the snapshots is accessed, and a point cloud representing the depth information is constructed.

In block 108, a mesh structure is constructed from the point cloud. In embodiments, the mesh structure is simplified, the mesh is parameterized (e.g., UV-mapped), and the parameterized mesh is used to produce a multi-sample atlas (discussed further below).

In block 110, the light field(s) on the surface(s) of the mesh structure are calculated. In an embodiment, a light field is calculated using spherical harmonics (SH) as the compression mechanism.

In another embodiment, light characteristics are stored for a number of fixed directions. Then, when light/color is reproduced for a particular direction, it can be reproduced by interpolating values for the neighboring (e.g., the nearest) directions that were stored.

SH can be used for encoding incoming light at a point. That information can be used, for example, to evaluate surface appearance based on material parameters and view direction. In embodiments, rather than storing incoming light, light that is emitted or reflected from a surface is stored. Thus, SH is used to store the final appearance of the surface. When the surface is then drawn on a screen, its color can be decoded using SH directly, without having to perform other computations.

In block 112, in an embodiment, a surface light field is represented as a texture.

In block 114, in an embodiment, a renderer uses the surface light field with geometry information to reproduce, in virtual 3D, the scene captured in the snapshots. In essence, a virtual 3D snapshot is produced from multiple snapshots. The reproduced scene can be displayed, manipulated, and viewed from different perspectives (e.g., in response to user inputs).

Following is a more detailed discussion of the operations performed in the method just described.

Taking Snapshots within an Application (Blocks 102 and 104 of FIG. 1)

The 3D reconstruction process uses multiple view captures. Each capture holds information about the camera (such as position, orientation, and/or projection), and depth and color (e.g., RGB) information per pixel.

The quality of the captures is a significant factor in the quality of the reconstruction. For example, if some part of the scene or object to be reconstructed and rendered ("model") is not captured, it can produce an empty area; or if some part of the model is captured from large distance and thus is sampled at a low frequency, then the quality of the reconstruction can be affected.

In the capture mode, in an embodiment, a user is guided by providing the capability for the user to see the quality of each pixel projected onto the scene they are viewing, as represented in the captures that have already been made.

For example, in the capture mode, a pixel's color can be changed from its normal color to, for example, more red depending on the pixel's quality. Thus, if there are any parts of the projection that have not been reddened, the user will know those parts have not been captured. This might be acceptable to the user (e.g., the user does not want that part of the scene), or it can be used to indicate to the user that a capture of that part is needed.

Knowing that a pixel is part of a capture is useful, and it may also be useful to show the quality of a pixel's capture. The quality, in this context, can be that a sample is of a lower quality if it is on a gradient that is very on-edge with respect to the camera. That is, if the normal to the location of the pixel on the mesh is sufficiently perpendicular to the viewing direction, then the quality of that pixel may be considered to be lower than if the view direction was colinear, or more colinear, with the normal.

Another measure of quality is in the resolution of the sampling. If a single capture of an object is taken, then when moving closer to the object, the quality will be reduced because there will now be more information on a smaller portion of the object. This means that, in the example above, redness would decrease as distance to the object decreases. This is relevant to a situation in which a texture on an object is captured from a distance, then the captured texture is placed on the reconstructed model of the object and the texture object is viewed from a closer distance. Consequently, the texture quality would be reduced due to undersampling. On the other hand, if a screenshot of a high-resolution texture on a triangle occupies the full screen rather than a small number of pixels (e.g., three pixels) as it would be if captured from a distance, then the texture would be captured at a higher resolution and the reduction in quality will be less when moving closer to the object.

Consider an example in which a car is captured. A single capture from the front of the car can be taken such that the entire car is in view. Those pixels will be a darker red, but pixels that are from a surface at a more oblique angle (e.g., the car's hood) will be a lighter red, because their quality will be less. As the obliqueness of the angle increases, the surface occupies less space on the screen and more information (e.g., geometry details and texture details from the depth and image captures, respectively) may be lost. None of the pixels at the side of the car will be red because that was not captured. If the capture was from the side instead of the front, the capture will be reddened when viewed from the front. Moving closer in on a wheel, for example, will cause the redness to get lighter (because the quality from that perspective is less than that of the frontal perspective). If the wheel is captured from a direct perspective, it will be a darker red.

Advantages to the approaches just described include: the user is in control of what parts of the model is captured; the user can see during capture what parts of the model have not been covered; and it is possible to see an indication of the quality of a particular capture.

Generating a Point Cloud Using Snapshot Data
(Block 106 of FIG. 1)

In embodiments, a point set is an abstract data type that can include an n-dimensional (e.g., 3D) point.

In embodiments, a representation is an octree, with leaves that hold one or more points that must all be inside an axis-aligned bounding box (Aabb) node above it in the octree. Pointers can be used to represent references to nodes in the octree, and a node in an octree will hold what type of node it is (e.g., a leaf node or an inner node).

In embodiments according to the invention, instead of using pointers, a special encoding is used that allows selection of the size for storing such a representation. For a general-purpose representation, 32 bits can be used. This reduces by half the size usually required for pointers in a 64-bit system. Also, this avoids each node storing what type of node it is, which further reduces overhead. Furthermore, this avoids the overhead and inefficiency associated with storing leaves and nodes through dynamic allocation, where space is consumed for allocator overhead and locality of reference is less than ideal.

The encoding of the node type can thus be removed from the node. The reference instead knows what it is pointing to. There are at least three reference types: nothing; leaf node; and inner node.

In an embodiment, instead of having a pointer, the index of a particular node is encoded within the reference along with the type. The actual nodes are stored in some other representation that is indexable, such as an array. An alternative is to have chunks of fixed size in powers of two, and to look up the block separately from the index within a block.

An example of one way to describe this in C++ is shown in Table 1.

TABLE 1

```
enum class NodeType
{
  NOT_USED,
  OCT,
  LEAF,
};
enum class NodeRef: uint32_t;
static NodeRef makeNodeRef(NodeType type, int index) { return NodeRef(int(type) I (index << 2)); }
inline static int getIndex(NodeRef ref) { return int(ref) >> 2; }
inline static NodeType getType(NodeRef ref) { return NodeType(int(ref) & 3); }
  struct LeafNode
  {
    enum { MAX_LEAF_POINTS = 23 };
    void initO { m_numPoints = 0; }
```

TABLE 1-continued

```
    int m_numPoints;
    DirectX::XMVECTOR m_points[MAX_LEAF_POINTS];
};
struct OctNode
{
    void initO
    {
        for (int i = 0; i < 8; i++)
        {
            m_nodes[i] = NodeRef::NOT_USED;
        }
    }
    NodeRef m_nodes[8];
};
struct PointSet
{
    // . . .
    std::vector<LeafNode> m_leafNodes;
    std::vector<OctNode> m_octNodes;
};
```

A leaf can hold many points. If a leaf is full, it can be split into an "OctNode" with "LeafNodes" (Table 1) underneath it.

Multiple points can hold the same value, but not more than "NOT USED" (Table 1). This may be useful when storing extra data with the position, when the PointSet (Table 1) class is being used as a way to look up data quickly from a point cloud and some points with different data are in the same position.

These approaches provide a number of advantages: more control of the size of a reference (it does not have to be pointer-sized), depending on requirements of the octree being used; storage is not needed for node type in a node; multiple points at the same position are allowed; and node types are stored in vectors, which is better for memory usage, reducing fragmentation, and improving cache coherency.

Constructing a Mesh from the Point Cloud (Block 108 of FIG. 1)

Meshing of large scenes based on larger numbers (e.g., hundreds) of screenshots can require a lot of memory. In an embodiment, this is addressed by subdividing a meshing domain into several overlapping blocks, and then performing meshing in the blocks in parallel (e.g., on different hardware).

In an embodiment, a quadtree-based solution is used to unproject polygons from the depth buffer, to subdivide a polygon (e.g., a quad or triangle). This method is simple and fast.

In another embodiment, a Voronoi-based reconstruction is used. A point cloud is generated from all views, and then neighbor points are connected to get a final surface. To do this, a local two-dimensional (2D) Voronoi diagram can be employed. Each point in the point cloud contains a normal, which may be calculated from the capture information.

Figure 2:
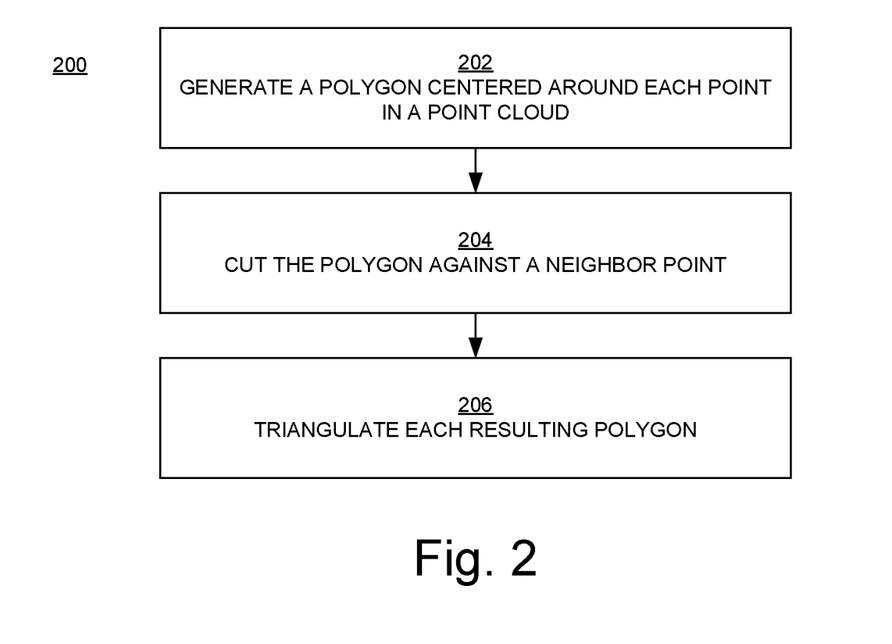
FIG. 2 is a flowchart of an example of a method for generating a mesh structure in embodiments according to the invention.

FIG. 2 is a flowchart 200 of an example of a method for generating a mesh structure in embodiments according to the invention. The flowchart 200 can be implemented as computer-executable instructions residing on some form of computer-readable storage medium (e.g., in memory of the computer system 500 of FIG. 5).

In block 202 of FIG. 2, for each point in the point cloud, a polygon that is centered around the point and is perpendicular to the normal for that point is generated.

In block 204, the polygon is cut against a neighbor point by placing a cutting plane in the middle of the segment connecting the respective point and the neighbor point.

In block 206, each polygon resulting from the operations of block 204 are triangulated to generate the mesh structure. Triangulation or triangulating is the decomposition, conversion, or mapping of a polygon into a set of triangles. In embodiments, each polygon is not separately triangulated. As described below, each polygon contains information about its neighbors, so the polygons for an entire structure can be converted or mapped to a different representation, specifically to a group of triangles due to the direct relationship between a Voronoi diagram and a Delaunay triangulation.

More specifically, in an embodiment, for each point in the point cloud, a polygon (e.g., a basic quad) is generated in such a way that it is centered around a point and perpendicular to the point's normal. Then, this polygon is cut against neighbor points by placing a cutting plane in the middle of the segment connecting the base point and a neighbor one. The ID (index) of a point which formed some cut is saved.

In this embodiment, each resulting polygon is a Voronoi cell, and it contains all point indices that form it. Diagrams of the cells can be converted to a Delaunay triangulation, because there is a relationship between a Voronoi diagram and a Delaunay triangulation.

To improve quality, an adaptive point cloud generation can be used. A point is sampled from an input point cloud if there are no points in some neighborhood or with probability depending on normal vector variations. This improves sampling on the edges.

The Voronoi-based approach is fast and shows good results on surfaces with low curvature and low amount of noise in the point cloud.

The Voronoi-based approach just described may produce a surface with a number of holes. To reduce the number of holes in the resulting surface, a hole filler can be implemented to find loops that contain less edges than some threshold, and then can be used to retriangulate those loops.

Figure 3:
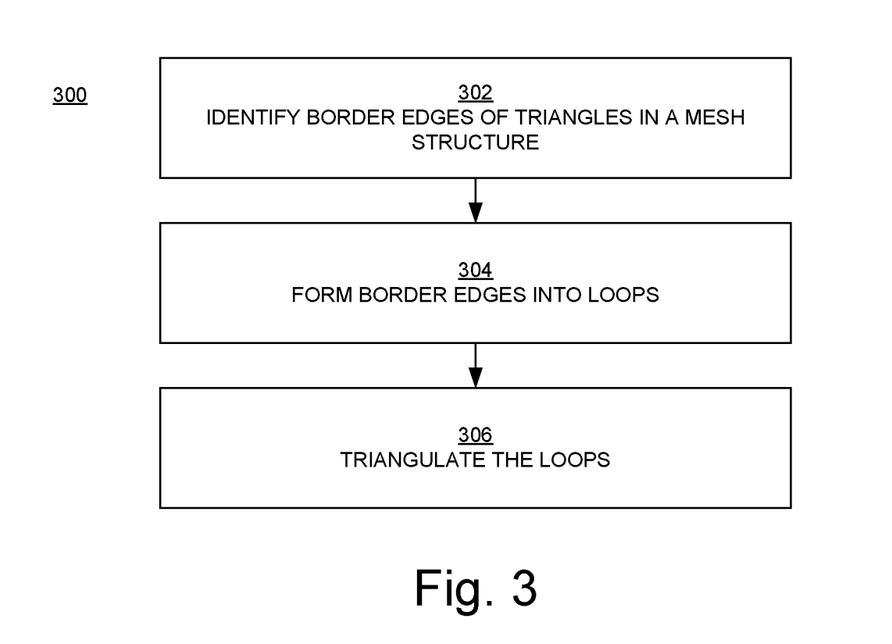
FIG. 3 is a flowchart of an example of a method for implementing a hole filler in embodiments according to the invention.

FIG. 3 is a flowchart 300 of an example of a method for implementing a hole filler in embodiments according to the invention. The flowchart 300 can be implemented as computer-executable instructions residing on some form of computer-readable storage medium (e.g., in memory of the computer system 500 of FIG. 5).

In block 302 of FIG. 3, each edge of triangles in the mesh structure is checked to determine if there is an adjacent edge of a neighboring triangle. When there is not the adjacent edge then the edge is identified as being a border edge on a border of a hole in the mesh structure.

In block 304, edges identified as being border edges are formed into loops, where each of the loops corresponds to a respective hole in the mesh structure.

In block 306, each of the loops is triangulated.

More specifically, in an embodiment, a hole filler is implemented as follows. All of the mesh triangles are accessed and evaluated. Each edge of a triangle is checked to determine if there is a similar edge in another triangle. If there is not another such edge, then the edge lies on a border of a hole. A graph is then built from all border edges. Loops, which are holes in the input mesh, can be found using a depth-first search. Each loop is then triangulated. In one such embodiment, to improve quality, only loops that have a number of edges less than a predefined threshold are triangulated.

A third approach is based on a signed distance function (SDF) generated from a point cloud, and meshed using a method such as marching cubes, SurfaceNet, or Dual Contouring. To accelerate processing, an octree search structure can be used. SurfaceNet shows good quality and requires fewer computations.

In a SurfaceNet embodiment, each vertex is generated as the center of a voxel that exhibits an SDF sign change. Then, to improve quality, additional processing is applied to such vertices.

For each voxel that exhibits an SDF sign change, Dual Contouring computes points of intersections of voxel edges with an SDF zero-value surface, and also computes normal vectors at those points. Those points are then used to compute final surface points as a minimizer of a special function.

In embodiments according to the present invention, an approach that is less complex than Dual Contouring is used. In those embodiments, the points where edges intersect with an SDF zero-value surface are computed as in Dual Contouring. A final point that is the center of mass of the computed points can then be determined. A final mesh can be produced by connecting the vertices of voxels computed in the previous step that share a common edge that exhibits a sign change. The quality of the resulting mesh can be improved using an octree to provide higher voxel resolution where it is needed.

The SDF approach shows good results. Additional mesh reconstruction quality gains may be achieved through multilevel SDF restoration.

Instead of a triangulator that needs to have loops classified as outer loops or holes, a classifier may be used. The classifier finds loops from a polygon soup of the edges and then determines, via area and containment, which are holes and which are outer loops. The classifier also associates holes with the outer loop they belong to. It can be used as the stage before triangulation in a triangle-based approach.

Boolean Union of View Volume Representation

As described above, multiple views of a scene are captured, and each capture holds information about the camera (such as position, orientation, and projection and depth information). In embodiments, a 3D reconstruction of the scene is produced using the multiple captures. In embodiments, a representation that can be used to quickly query information about the scene is produced using the multiple captures. In embodiments, a set of views and/or screenshots from a set of points in space is produced, and the set of views/screenshots can be replayed for a viewer that is looking at the scene. In the latter embodiments, a 3D model may not be included in the representation; instead, images are chosen (perhaps on the fly) to represent the view from the camera that is being used to look at the captured scene. In embodiments, SDF is used to represent the entire scene, in which case a 3D model may not be included in the representation.

One way of doing this is to treat each view (combination of camera and depth buffer) as defining a piece of empty space. It can be rapidly determined if any point in world space is inside this volume by projecting it into the pixel space of the depth buffer and testing its depth against the depth buffer/near clip plane. Thus, the view essentially describes an empty volume carved out of "solid space."

Multiple views can be used to describe a 3D approximation of a scene that has been captured. By taking the Boolean union of all of the volumes described by all of the views, the volume created will hold a 3D representation of the scene. The more views that look at different parts of the scene, the more carved out the representation will be. Areas in the real scene that are not captured may appear to be filled; that is, in an approach, parts of the volume that have not been captured will conservatively be seen as solid. This may be advantageous depending on usage. This will always produce a closed surface: as each view volume is closed, so therefore the union must also be closed.

To determine if a world space point is inside or outside of the space defined by all of the views (the Boolean union of the volumes defined by each view), the point is tested against each view. If a point is inside any view, it must be inside the union; and if it is outside all views, it is outside the union.

If there are many views, a spatial hierarchy (for example, an Aabb tree of the volumes) may be used to quickly decide which views a point might be in.

This technique offers a number of advantages. The resultant volume is always closed. The test for inside/outside is fast, easy, and well-defined. Determining if a point is inside or outside a view is O(1): a matrix multiply, a divide, and a sample. Determining the Boolean union of multiple views is O(n), where n is the number of views, or O(log 2(n)) with hierarchical bounding. The representation is compact, and introduces no approximation of the representation. The ground truth data can be directly used when sampling. The representation is very compatible with graphics processing units (GPUs) and almost exactly matches the hardware (a projection and depth buffer sample/test).

View Space Volumetric Sampling

The above discussion of Boolean union of view volume representation describes a mechanism for rapidly determining a 3D representation of a collection of views defined by the camera (position, orientation, projection) and the depth buffer. In that discussion, the representation is implicit: it provides a mechanism for rapidly determining if a given point in world space is either inside or outside of the union of the volumes. Presented here is a discussion of how to use that to generate an explicit representation and to query it in a volumetric manner.

One mechanism to produce a volumetric representation is the marching cubes algorithm. In order to use this algorithm, it is useful to test an Aabb against the volume.

For a dual contour marching cubes algorithm (a version of marching cubes that can take into account corners and edges), a distance to a surface along a cardinal axis is measured and the normal at that intersection is determined.

Conceptually, for each view, the frustum and depth buffer define a volume. These volumes of the combined frustum and depth buffer may be referred to herein as a "view volume." The view volume representation is fairly compact and is amenable to firing rays and determining normals at intersections. A ray cast can be sped up by having the depth values stored in mipmaps, which hold the depth extent of a pixel. The normal is then determined by working out the normal of the triangle that is first hit by the ray (the triangles are defined two per pixel). A volume can be created from the multiple captures by taking the union of all of these view volumes. This will always produce a closed surface: as each view volume is closed, so therefore the union must also be closed.

An Aabb can be tested against the view volume. This allows the use of the same logic as previously described to determine if the Aabb is inside or outside. Namely, if it is inside (or partially inside) any view, the result is inside/partially inside. If it is outside all views, it is outside. A point is inside that volume if it is inside the planes of the volume and also inside the depth buffer. This can be calculated for a point in world space by transforming it into pixel space. If the pixel space point is outside the frustum (e.g., clipped), it is trivially outside. It is inside the depth buffer if it is less than or greater than the value at that pixel position in the depth buffer, depending on the depth ordering of the depth buffer. For a point to be inside, it therefore has to be inside the view frustum and the depth buffer.

To do the test, an Aabb is approximately projected into clip space, clipped, and then the resulting rectangle of texels is used to test if there is a possible intersection. If there is a possible intersection, the world space Aabb can be tested against any suitable world space representation of the underlying depth buffer. For example, each pixel in the depth buffer could be represented as two triangles in world space.

An efficient way to do this is to take the corners of the Aabb in world space and transform them into camera space while determining their camera space Aabb. With the camera space Aabb, the minimum and maximum of the Aabb can be transformed into the view clip space. This volume will typically be larger than the original Aabb, but it is conservative, such that it always contains the world space volume of the Aabb. An imaginary line in clip space can be extended from the minimum to the maximum points. The volume is clipped in w (or z). If that line is clipped outside the view volume, then the frustum is outside and the test is complete. Then, the Aabb is divided through by w (known to be greater than 0.0f) and clipped in 2D normalized device coordinates (NDC).

The result is a rectangle that is fully inside the NDC. This defines the pixels that the Aabb could contact (and because it is a conservative determination, some that it cannot).

A tighter NDC/pixel space rectangle can be obtained if Aabb is transformed and clipped, and then used to calculate the bounds. However, this requires more complex and therefore computationally expensive clipping, and would require eight divisions even with no clipping and when all points are inside. The more approximate technique described above needs only two divisions.

The process just described can be performed for each point, and also an Aabb may cover millions of pixels when projected into NDC/pixel space and be wholly inside or outside, and so the process can be shortened by reducing the number of tests.

In an embodiment, to reduce the number of tests, a form of mipmapping on the depth buffer is used, where each "pixel" of each mipmap contains the minimum and maximum values of the depth buffer values they cover. Mipmap generation can be performed quickly, by producing minimum/maximum values for the most detailed mipmap level required, and then producing the next smallest level by taking the minimum/maximum of the four pixels beneath. This considerably speeds up performance, as once the Aabb is projected into pixel space, the closest mipmap level for that size is tested first. If the depth extent of the Aabb does not intersect that of the associated texels, then the intersection is easily computed.

With the world Aabb in NDC/pixel space, the axis of greatest length can be found. That axis can be used to choose the lowest-detail mipmap where a single sample contains the entirety of the pixel space rectangle. The depth range of the Aabb can then be tested in pixel space against the mipmap depth range. If there is no overlap, then the Aabb can be determined to be inside or outside of the volume. If this cannot determine whether the Aabb is inside or outside the volume, then the process recursively iterates to the next most detailed mipmap, discarding pixels. This is repeated until the position of the Aabb relative to the volume (e.g., either inside or outside the volume) can be unambiguously determined. If not, then the test can be repeated with the next largest mipmap a level higher, proceeding all the way to the depth buffer if there is an intersection, and only testing the depth buffer directly where the depth range values intersect. If the highest detail level (the depth buffer) is reached, the actual triangles are tested against the Aabb.

It is also possible to use a more sophisticated intersection test, where each depth range in a mipmap defines an eight-sided convex volume in world space. Testing for the intersection of these volumes (with Separation Axis Test (SAT), Xeno, Gilbert-Johnson-Keerthi (GJK), etc.) can lead to fewer overall tests.

However, the basic test works well with GPU hardware. The basic test can be achieved using an occlusion query of the Aabb in world space against depth buffer: if all pixels are potentially drawable, then it is inside the volume; and if none are drawn then it is outside. "Front" and "back" faces are drawn separately. Optionally, the number of pixels the GPU will potentially draw is determined by rendering without a depth test. Clipping the near clip plane is specially handled because it can return no intersection when it clips the near clip plane.

The methodologies described above provide the following advantages: fast rejection testing either inside or outside; the depth buffer is only tested where there is a likely intersection (as determined by depth range overlap); representation overhead (typically 2*⅓*depth map size) is relatively low; it works well with GPUs; depth range mipmaps can be generated on GPUs; sampling against can be done on a GPU; and it provides the potential to wholly test directly on a GPU with occlusion query test(s).

Initial Octree Generation

As described above, in embodiments, a structure that represents the view volume is created instead of combining all views into a single representation (such as with adaptive signed distance function). In the code base, this is the ViewVolume type. The view volume consists initially of the depth buffer and the associated matrices for the projection view to map to and from world space and pixel space.

The ViewVolumes are combined via a union. This can be done by sampling each of the view volumes and combining the results. A method of sampling is to test the view volume against a bounding box (Aabb in the code). The result of the test can be relatively simple: the Aabb is fully outside the ViewVolume; the Aabb is fully inside the ViewVolume; or the Aabb somehow intersects the boundary with the inside or the outside (e.g., it intersects the frustum and/or the depth buffer).

These tests can be combined as a union with the following observations: a) if an Aabb is fully inside any ViewVolume, then the Aabb is inside the union; b) if an Aabb is outside all ViewVolumes, then the Aabb is outside the union; and c) if neither of these are true, then the Aabb must contain the boundary of the union.

With this, an octree can be used to adaptively determine the Aabbs that contain the surface. Initially, an Aabb that is large enough to contain all of the ViewVolumes is used. That Aabb is then tested against the ViewVolumes.

If the result is a) or b) above, the process stops. If the result is c), then the process recurses down a level of the octree and is repeated until an accuracy that satisfies a threshold is determined.

This method can be used to produce a point cloud of Aabb centers that closely follows the union of ViewVolumes.

A projection of an Aabb into pixel space of a view volume can produce a very large area. To improve performance, the mipmapping approach described above can be employed.

Producing a Surface

This approach can be used to turn a surface into a triangle mesh. In an embodiment, this is done using a version of a marching cubes algorithm.

The octree mechanism described above can be used as the basis of the marching cubes algorithm. The octree is recursed downward until reaching a desired voxel size. The mechanism or octree decimation previously described herein essentially produces the conservative crust of voxels of the union of the ViewVolumes. The crust includes the voxels that define the marching cubes voxels needed. Thus, it is not necessary to perform other evaluations associated with marching cubes implementations, such as taking a point inside the surface and searching for its surface, and then walking over it.

For marching cubes, the corners of the cube are sampled for a distance. If negative numbers are inside and positive numbers are outside, then for the Aabb to be part of the surface it must have at least one positive and one negative corner.

The ViewVolume union does not have a distance to the surface. However, it can be determined whether a point is inside or outside. This determination decides which surface of the marching cube is to be used for a voxel. If the goal is to have the surface be close to the actual surface of the union, then the intersection along the edges of the marching cubes is accurately determined. This value can be determined by casting rays along the edges of the cube. A ray is cast along the edge from the outside to the inside (determined by the inside/outside determination at corners). Hits from a subset of ViewVolumes are received. To produce the union, the deepest intersection is the one on that surface.

With this, the following information for marching cubes is obtained: the position (either interior or exterior) at corners, and the intersection with the surface along the edges that intersect.

For both performance and mesh simplicity, an implementation holds a map of edge intersections, as each edge can be shared up to four times. This also means that vertices will be correctly shared in an output mesh.

Producing a Surface Adaptively

In an embodiment, a measure of flatness is used to determine whether an octree node should be split. More specifically, in an embodiment, when determining whether to subdivide a node, all of the samples are looked at, a normal is determined per sample (e.g., by principal axis determination, averaging the normals of backing triangles, etc.), and the extent of the points in the direction of the normal is measured to determine how "flat" the surface is inside the voxel. If that surface is identified as being very flat (e.g., the extent is smaller than a defined threshold value), then the contained surface can be approximated with a relatively flat polygon. Additional information is provided below.

A DepthViewVolume is an implementation of the ViewVolume that holds mipmaps of the depth buffer. In the mipmaps, each pixel holds a depth extent, describing the minimum and maximum depth values for the mipmap of more detail above it, and so on. Each one of the depth extent pixels can be thought of as a very small frustum, with the view point being the apex of the pyramid, and the view point and the near and far depth extents describing the near and far planes. Because they relate to a pixel (either in a mipmap, or the depth buffer), these pixels will be referred to here as frustals.

To represent the concept of flatness, the concept of a slab (SlabViewVolume) is introduced. Given a collection of depth points, a slab is a plane in world space and has width. All of the points in the depth buffer for a frustal are within the slab defined by the plane and its width. Width can be considered as a measure of flatness. When calculating the planes, the one with the minimal width is found. If the width is zero, then all of the points are exactly within the plane.

The frustal slabs are calculated from either the depth buffer directly, or from a higher level detailed mipmap if there is one. The next level down can be approximated by taking the four more detailed frustal slabs and calculating a new frustal slab that contains all of the corners of the more detailed slabs. This is an approximation; alternately, the slab can be calculated on the depth buffer values.

Thus, when doing the octree depth traversal, at each octree cell a measure of how flat it is can be determined if it is on the boundary of the union of the view volumes.

Although the depth buffer is contiguous over a single ViewVolume, it may not be so between ViewVolumes. It is also only defined for the depth buffer surface, not the rest of the frustum. Thus, when calculating the flatness over an Aabb over multiple ViewVolumes, the union aspect can also be taken into account. The union can be concave and/or have disconnected sections. To simplify the calculation when the union is non-trivial, the flatness can be calculated over an approximation of the slab in world space. Also, the flatness value may only be used where at least one view of the Aabb was all inside of the frustrum, to ensure continuity.

Determining Lighting Properties on Mesh Surface
(Block 110 of FIG. 1)

Delighting

Delighting converts a texture to a form representing the object as though the object was in an environment with no directed light, by removing shadows and other visual cues of directed light from the original captures. The process of delighting can include, for example, linear exposure correction, nonlinear exposure correction, and vignette correction. Nonlinear exposure correction may be like linear exposure correction, but with cubic fitting.

Aspects and objectives of delighting include chroma and lightness (e.g., maximizing chroma and lightness), the light direction from specular reprojection, specular mask generation, and probe delighting.

Delighting can be used to remove all lighting, including shadows, from a scene.

Alternatively, delighting can be used to remove only the color of ambient light from a scene. For example, when capturing an object from a scene (e.g., in a video game), the human visual system will deduce the color of the object relative to the color of the lighting in the scene. When the object is extracted from the scene as a 3D model, the object may appear odd to a viewer, as if the object itself holds the properties of the colors that came from the lighting in the scene. In an embodiment, this is overcome by correcting for the lighting on the input captured images (e.g., at the beginning of the processing pipeline). In another embodiment, this is overcome by correcting for the lighting on the output diffuse and specular textures, when using lighting approximation (e.g., at the end of the pipeline). The latter embodiment is advantageously fast and controllable and produces high quality results.

Delighting Exposure Compensation

If the renders are tone-mapped, that is comparable to the combination of exposure setting and film/sensor properties on a conventional (e.g., film) camera—between different captures, the exposure may change (because, for example, more of the image is very bright in some captures than in others). The film properties typically do not change between captures, but if this transformation is not inverted out, it will be included in the resulting reconstruction.

Thus, as part of delighting exposure compensation, it is useful to attempt to make pixel color values across images more equivalent. For some scenarios it is possible to capture the exposure information as part of the image capture. Exposure information can also be approximated with various algorithms from the images alone. By removing exposure effects, the output can be relit in different scenarios more accurately, thereby producing a higher quality result by not including exposure or by preventing different exposures across captures from introducing inconsistencies when blended together.

Material/Light Capture

SH transforms can be used in lieu of delighting to determine the surface light field. For any given point, information about what the light reflection (reflectance) looks like from multiple angles can be combined with SH into a function that approximates reflectance (interpolation plus compression via SH).

SH can be used for capturing low-frequency lighting effects. SH acts as a low-pass filter. Reflections can then be added using other techniques using an existing model geometry and environment map. A frequency representation can also be used for delighting.

In embodiments, SH is used to restore the surface appearance used to encode information about the color of particular points when those points are visible from a respective direction. For SH, multiple images are captured in a way such that each particular point can be seen in several images from several directions. Thus, the input for SH for restoration for each point includes a number of samples that each contain information about the color of the point when it is visible from each direction. In an embodiment, SH coefficients are reconstructed based on minimization of the squared error between sample values and a value evaluated with SH.

In embodiments, current SH approaches are improved using a hemispherical basis (hemispherical harmonics) or wavelets instead of spherical harmonics.

Snapshots can be captured, and color can be encoded, for each direction in an SH atlas. An SH atlas can be used for generation of diffuse/specular textures and for capturing other material characteristics in different ways such as: a) inferencing of material parameters through gathering statistics about spherical harmonics shape, like deviation from an average value or a width of a specular highlight "bulb" on a surface of SH; and b) inferencing of material parameters by a neural network, trained on a spherical harmonics dataset, which contains spherical harmonics captured in different light conditions from different materials with known properties.

SH can be used to store directional information about incoming light at a point, for example. That information can be used to evaluate surface appearance along with additional data, such as material properties.

In embodiments, rather than storing incoming light, light that is emitted or reflected from a point only when the point is visible is stored. In embodiments, SH is used to store the final appearance of the point. When a capture is subsequently reproduced, the direction from which each visible point will be viewed is known or can be determined. Thus, in an embodiment, the color of a point is decoded from SH using only the known direction. Such an approach is advantageous because view-dependent details (e.g., reflections and highlights) can be reproduced without having to know or determine surface properties such as reflectivity.

Figure 4:
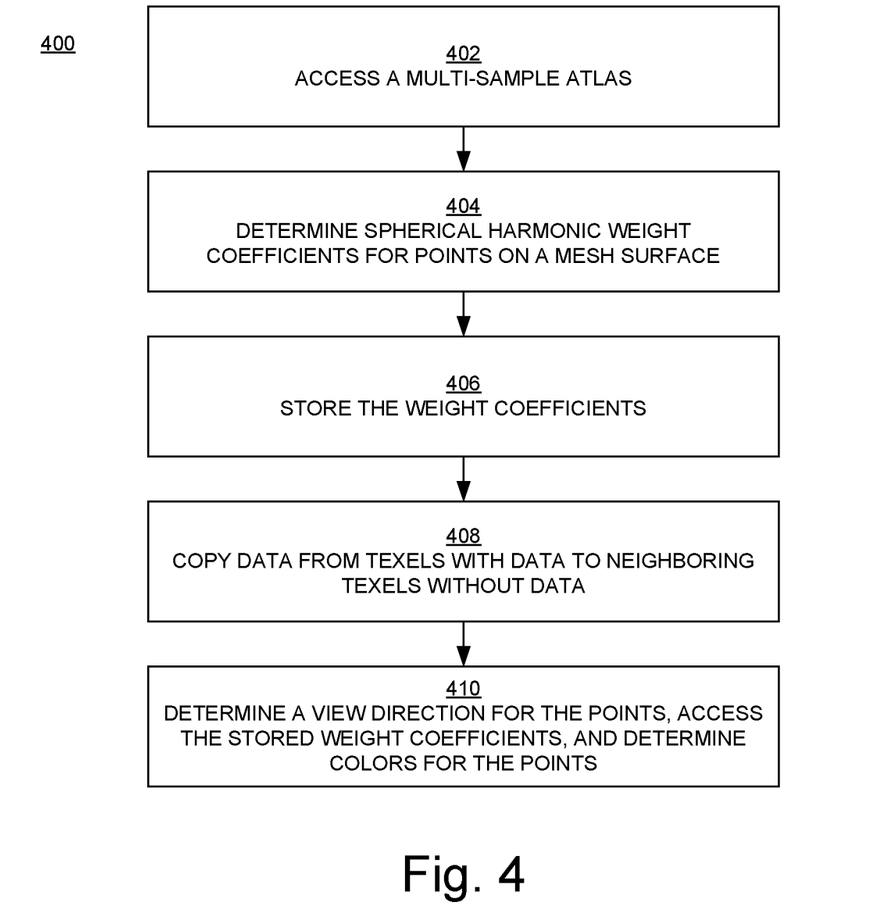
FIG. 4 is a flowchart of an example of a method for using spherical harmonics in embodiments according to the invention.

FIG. 4 is a flowchart 400 of an example of a method for using SH in embodiments according to the invention. The flowchart 400 can be implemented as computer-executable instructions residing on some form of computer-readable storage medium (e.g., in memory of the computer system 500 of FIG. 5).

In block 402 of FIG. 4, a multi-sample atlas (discussed further below) is accessed as an input. In an embodiment, the multi-sample atlas includes a number of color samples of points on a mesh surface when those points are visible from different directions.

In block 404, for each of the points, weight coefficients up to a specified order of SH are determined (e.g., computed) for each color channel. Higher orders of SH increase the amount of detail that can be captured and stored. In an embodiment, a maximum order of eight is used, which provides quality results while conserving computational resources.

In block 406, each coefficient is stored to an appropriate channel of 2D floating point RGB texture. An appropriate texel can be selected according to the UV-coordinate of the respective point on the mesh. The number of coefficients can be increased by increasing the number of textures used. In an embodiment, the coefficients are stored in the SH atlas.

Because parts of the mesh are laid out in a texture map with some spacing between them, some parts of the texture are not associated with an SH coefficient. Thus, when the model is rendered, those empty spaces can produce artifacts unless they are addressed. In block 408, in an embodiment, a post-processing step is performed to address this. A list of border texels (texels with data that have a neighboring texel without data) is generated. Data for each border texel is copied to its empty neighbor, and then the list of border texels is updated. This step is repeated until all texels are filled.

In block 410, for each point to be rendered, the view direction is determined, weight coefficients for that direction are accessed from texture maps, and that data is used to determine the final color of the rendered point.

Multi-Sample Atlas

Each capture of multiple views of a scene can hold information about the camera (such as position, orientation, and projection), depth information, and color information.

A parameterized 3D model of the scene can be generated. With that parameterization, a world space texture atlas can be rendered (described further below). Texture maps that sample from the views can then be produced.

In embodiments, a multi-sample atlas is used as a representation that stores a minimal set of information for this sampling. The multi-sample atlas can hold, for each texel of the atlas, samples that are associated with that texel. A texel may have zero samples, or a number of samples up to the number of views per texel. This can be represented relatively compactly by storing, for each scan line, the number of samples per texel, and then separately, in order, all of the samples per texel.

In an embodiment, the samples to be included within the multi-sample atlas are determined as follows. When a view is sampled, a world space position is projected into the view space of the view. If the position is not inside the view, there is no sample. Then, a check is made to determine if the sample is on the surface by testing the sample's distance to the depth buffer. If the sample is too far away from the surface (e.g., as measured against a defined threshold distance), it may not be included. Other filters can be used to determine whether to include a sample, such as comparing the quality of the sample, or determining how closely the normal of the sample matches that from the model. The normal test is useful because it lessens the chance that a sample on the wrong side of a thin surface is included.

The representation can be serialized, and then algorithms can be applied to it to produce results. The dataset thus holds only the samples that are of interest, and perhaps other precalculated data, in order to control subsequent algorithms for producing results.

There are several ways to store the sample data. If color sampling, a flexible way to store 64 bits per sample is shown in the example of Table 2.

By holding three quality metrics and the view index, it is possible to calculate the view direction without having the depth buffer, for example, or without other data associated with a view.

A number of advantages are thus provided: it is faster to load the multi-sample atlas than it is to load each image/depth map, project, sample, etc.; and the dataset is smaller, as it includes only samples that are in views and only at the resolution of the sampling of the atlas.

Representing Surface Light Fields (Block 112 of FIG. 1)

Specular Fitting as Approximation of View-Dependent Lighting

Each capture of multiple views of a scene can hold information about the camera (such as position, orientation, projection) and depth and color information. The approximate position/type/color of light sources can, for example, be calculated from the captures.

A model with a UV parameterization and the multi-sample atlas can be used to find all of the color pixels associated with each view for a texel for every texel of the texture atlas.

The model can be rendered such that the lighting matches the original capture. One way to do this uses the sample colors. Lighting that is important in this context is any view-dependent lighting, such as specular or environment mapping type effects. The diffuse and shadowing from the original capture will be correct whatever the view is in the reconstructed model.

An approach to displaying this lighting is to vary the color based on the view direction from the texel to the viewer. In the general case, there are two degrees of freedom, and the color is looked up based on a hemisphere around the texel.

Another approach is based on an observation that most view-dependent lighting can be approximated as Phong shading or any similar 3D surface shading technique. This may not be the case for environment mapping, but in effect the technique will approximate that with a specular blob. By assuming lighting is Phong-like, the data needed for the lighting model can be calculated using only the normal, the diffuse color, the specular color, and the material shininess for each texel.

The material's specular color can be calculated by evaluating each light and each sample, and looking at the samples that are brighter than the diffuse color. If the color is clipped, then this can be accounted for. A channel has likely been clipped if its value is close to one. To determine the color, the ratio between color channels is determined. If the other non-clipped channels are divided by the maximum non-clipped channel intensity, the ratio is expected to remain approximately the same. The ratio for all non-clipped channels is determined and weighted by the strength of the largest non-clipped channel. The result is a normalized color, which is scaled by an intensity that is similarly

TABLE 2

| | |
|---|---|
| PackedArgb32 m_colorAndQuality; | ///< |
| The quality is the 'flatness' quality (i.e., when bad is near an edge, or particularly noisy) | |
| uint16_t m_viewIndex; | ///< |
| The view this sample was taken from | |
| int8_t m_depthIntegral; | ///< |
| Multiple of the m_depthScale | |
| uint8_t m_mipSampleQuality; | ///< |
| Measure of the quality of the sample. 1 is highest. | | determined, by performing the specular calculation based on view position and the largest channel value.

The specular shininess can be calculated by evaluating the shape of the intensity as the view direction changes on the samples, and fitting the power curve to produce an approximate shininess.

Surrounding texel values and a smoothing process can be used if high frequency noise produces undesirable artifacts.

It is also possible to use the above Phong-like methodology with a predetermined and/or user-set specular shininess.

The normal can be calculated in different ways, including fitting to the sample data. This has the advantage of potentially being able to pull data from the normal map of the original model. It can also be calculated from the depth buffer from captures, using a weighted average across views.

The above approach is relatively simple to implement, requires less storage, and generally produces reasonable results. Other advantages include: only three textures (diffuse, normal, and specular color/shininess) are needed (or only two if specular color is fixed or encoded in-model); high frequency specular effects are handled; and it can run efficiently on hardware with pixel shaders (e.g., on mobile devices).

Converting and Rendering (Block 114 of FIG. 1)

Resampling Model Attributes with World Space Atlas

In some instances, the model is a very high polygon version with associated data. To create a lower polygon version of that model, the associated data can be applied as a texture map to the lower polygon model.

If the data can be accessed from the source dataset through a world space position, then it is possible to reduce the number of polygons in the original model, without taking into account any parameterization. Once a low polygon model has been produced, a UV parameterization using, for example, an isochart texture atlas can be calculated. The performance of many polygon reduction techniques such as quadric error metric edge removal can be simplified and improved by not having to take into account any other parameters other than the shape of the model.

With a parameterized low polygon model, associated parameters (such as color, or normal, etc.), or just data that is associated with the model in world space (e.g., a point cloud of colors), can be accessed from the original model.

To achieve this, an image the size of a desired texture atlas is rendered, and a world space position is held at each texel. The UV values control the vertex positions of the triangles of the mesh, and the world space position is interpolated or calculated via barycentric coordinates per pixel. At the completion of the rendering, a world space texture atlas holds the associated position of that texel in world space.

With this, the actual texture map of desired values is produced by taking each set texel of the world space texture atlas and looking up the associated data in the original dataset.

A parameterized 3D model of the scene can be generated. With that parameterization, the world space texture atlas can be rendered. Texture maps that sample from the views can then be produced.

The methodology just described provides a number of advantages: it separates UV parameterization from simplification; by not having to take into account a UV mapping of the original model, simplification is less complicated, faster, and the type of simplification is not limited; it is not necessary to parameterize (UV-map) a very high polygon model, which may be time-consuming; a lookup only needs to be performed once for each resultant texel; and the world space texture atlas can also record other information and may be used in other calculations.

Quality Measures for Varying UV Parameterization

In embodiments, quality measures for varying UV parameterization include controlling the UV mapping via the standard deviation of samples from a triangle in UV space.

Texture Mapping Surface

With the UV mapping, a scanline renderer is used to determine the colors that should be applied to each pixel of the texture map. The renderer is fed the coordinates in UV space of the triangles. As it rasterizes, it calculates which pixels are associated with what UV space and with which primitive. With this information, barycentric coordinates can be used to determine the pixel in the UV space of the triangle primitives, and then that information can be used to calculate the point associated with the UV in world space. With a point in world space, an associated color can be determined.

The world space position and color for each point in the view volume can be stored in an octree. Then, when rasterizing, the octree can be queried for the closest point, and its associated color can be used.

To simplify/decouple the color lookup section from the scanline rasterization, the scanline rasterizer is set up to rasterize a XMVECTOR map (Table 1 above), with the x,y,z values corresponding to the world space position and w containing the primitive (e.g., triangle index) that it is associated with. With this information, it is possible to determine barycentric coordinates from the world space position and the world space position of the vertices. This can be used to interpolate the normal vertex, calculate the UVs, or for other uses.

A good color for pixels in the atlas is the color of the closest set pixel. To determine reasonable values for all pixels, the PointSet class used for determining the closest color can be used. All of the points of the edges set of the outline of the rasterized triangles are added to an octree structure. Then, every pixel of the world space texture atlas is tested to see if it has been rasterized. If it has been rasterized, the PointSet class is used to look up the closest point with a set color, which is copied to that pixel.

Using the closest position in world space to select texture atlas color is fast and simple.

A world space normal can also be calculated when rasterizing the UV mesh. This can be compared against the normal of the closest point or points. The point within some range that has the most similar normal will rule out choosing the point on the wrong side of a thin laminar.

Sampling the original images instead of looking up samples in an octree based solely on distance provides advantages, such as ease in finding adjacent pixels and determining which pixels are of higher or lower quality. For example, pixels that are more "on-edge" relative to the camera are more likely to contain pixel colors that are more filtered and thus contain less information. For example, consider a render of a sphere that is mapped with a high frequency texture. In the direction from the center of the sphere to its edge, pixel samples in the capture will become a blend of an increasing number of texels from the texture mapping of the sphere. Also, on-edge pixels can affect anti-aliasing because anti-aliasing combines samples that are on the sphere and others that are not.

Pixels close to a silhouette edge are likely to not be high quality samples because of filtering and also because they likely separate elements that are not connected. To handle this, the edge and flatness of a pixel are measured through two nine-tap filters. This quality measure is then stored as a value in the alpha of a pixel.

For every pixel of the world space texture atlas image, there are x,y,z values and a primitive index. The normal for each primitive is precalculated for fast and easy lookup.

In embodiments, the world space x,y,z values for each pixel are used. Each view can be tested to determine if it is inside the view frustum when projected. If it is inside, then its depth can be tested. The color buffer can be sampled, and the dot product of the normal with the pixels normal can be used as a measure of quality.

With a set of samples, along with quality measures (like the pixel quality, dot products of normal closest to one, etc.), the samples to accept and reject can be chosen. Samples can also be blended based on the quality, with the higher quality samples getting higher weightings.

Example Computer System

Figure 5:
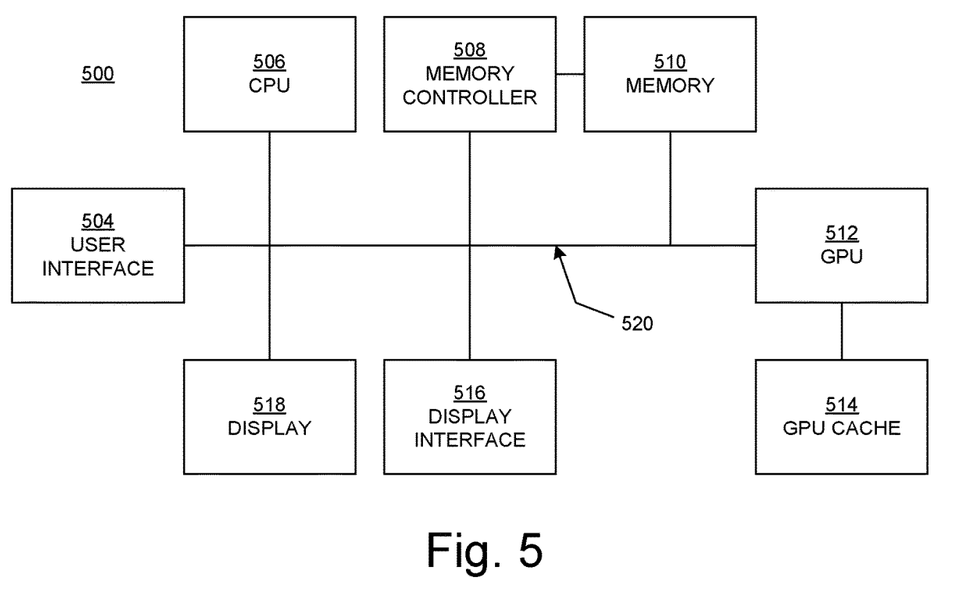
FIG. 5 is a block diagram of an example of a computing device or computer system capable of implementing embodiments according to the invention.

FIG. 5 is a block diagram illustrating an example computing system 500 upon which embodiments according to the present invention can be implemented. The computing system 500 may be, but is not limited to, a computer, a video game platform or console, a wireless communication device (e.g., a smartphone). In general, the computing system 500 is a type of device that processes and/or displays graphical data.

In the example of FIG. 5, the computing system 500 includes a user interface 504, a central processing unit (CPU) 506, a memory controller 508, a memory 510, a graphics processing unit (GPU) 512, a GPU cache 514, a display interface 516, and a display 518, each of which can communicate with the other components using bus 520. A computing system on which embodiments according to the present invention can be implemented may include other components in addition to those just listed, or it may not include all of the listed components.

The memory 510 is accessible to both the CPU 506 and the GPU 512. Significantly, the memory 510 is accessible to the CPU 506 even if the GPU 512 is in an invalid state. An invalid state may result when, for example, the GPU crashes, locks up, freezes, or stalls.

In an embodiment, the GPU 512 has a highly-parallel structure. For example, the GPU 512 may include multiple processing elements (e.g., pipelines) that are configured to operate in a parallel manner. Each pipeline can include more than one processing units or stages.

The CPU 506 can execute one or more software applications. The software applications that execute on the CPU 506 include, but are not limited to, an operating system and an application such as but not limited to an application or applications that perform the functions, methods, and techniques described above. The software applications that execute on the CPU 506 may include one or more graphics rendering instructions that instruct the GPU 512 to execute and provide graphics data to the display 518. In some examples, the software instructions may conform to a graphics application programming interface (API)). The CPU 506 issues a command stream containing one or more graphics rendering commands (such as but not limited to draw commands) to the GPU 512 to cause the GPU to perform some or all of the rendering of the graphics data. The CPU 506 can also issue other types of commands to the GPU 512, such as but not limited to compute commands (e.g., general purpose computing commands, state programming commands, memory transfer commands, etc.). In an embodiment, a GPU driver receives the instructions from the software application, via the API, and controls the operation of the GPU 512 to service the instructions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

What is claimed is:

1. A method comprising:
  receiving, using one or more processing units, data representative of one or more depth values corresponding to a one or more images of at least one object captured from one or more perspectives within a virtual scene;
  generating, using the one or more processing units, a mesh structure corresponding to the at least one object based at least in part on the one or more depth values;
  determining, using the one or more processing units, one or more lighting characteristics associated with the mesh structure, the one or more lighting characteristics being encoded using spherical harmonics; and
  rendering, using the one or more processing units, a three-dimensional representation of the at least one object based at least in part on the mesh structure and the one or more lighting characteristics.

2. The method of claim 1, wherein the one or more images are captured using one or more virtual cameras within the virtual scene.

3. The method of claim 1, further comprising:
  generating a point cloud based at least in part on the one or more depth values,
  wherein the generating the mesh structure is executed based at least in part on the point cloud.

4. The method of claim 1, wherein the data is further representative of one or more color values corresponding to one or more pixels of the one or more images and the one or more depth values correspond to one or more pixels of the one or more images.

5. The method of claim 1, wherein using the spherical harmonics comprises encoding at least one of incoming light, emitted light, or reflected light.

6. The method of claim 1, further comprising:
  generating a texture representation based at least in part on the one or more lighting characteristics, wherein the rendering the three-dimensional representation is based at least in part on the texture representation.

7. The method of claim 1, wherein the generating the mesh structure comprises:
for a first point in a point cloud generated based at least in part on the one or more depth values:
generating a polygon that is centered around the first point and is perpendicular to a normal for the first point;
cutting the polygon against a neighbor point of the first point in a middle of a segment connecting the first point and the neighbor point to generate a cut polygon; and
triangulating the cut polygon.

8. The method of claim 1, wherein the generating the mesh structure includes executing a hole filler algorithm to fill one or more holes of the mesh structure.

9. The method of claim 8, wherein the hole filler algorithm includes:
identifying a border edge on a border of a hole in the mesh structure by at least determining there is not an adjacent edge of a neighboring triangle to at least one edge of at least one triangle in the mesh structure;
forming at least one loop comprising the border edge, wherein the at least one loop corresponds to the hole in the mesh structure; and
triangulating of the at least one loop.

10. A processor comprising:
one or more circuits to render a three-dimensional representation of at least one object in a virtual scene from one or more images captured from one or more perspectives within the virtual scene, wherein rendering the three-dimensional representation is executed based at least in part on: (i) a mesh structure generated based at least in part on one or more depth values associated with the one or more images; and (2) one or more lighting characteristics associated with the mesh structure, wherein a first lighting characteristic of the one or more lighting characteristics is determined based at least in part on spherical harmonics.

11. The processor of claim 10, wherein the mesh structure is generated based at least in part on a point cloud generated using the depth values.

12. The processor of claim 10, wherein the one or more depth values are associated with one or more pixels of the one or more images.

13. The processor of claim 10, wherein the processor includes one or more parallel processing units, and the mesh structure is generated using parallel processing of one or more blocks associated with the mesh structure.

14. The processor of claim 10, wherein a second lighting characteristic of the one or more lighting characteristics is represented using a texture map.

15. A system comprising:
one or more processing units;
one or more memory devices storing instructions that, when executed using the one or more processing units, cause the one or more processing units to execute instructions comprising:
receiving data representative of one or more images of a virtual scene;
generating a point cloud based at least in part on the data;
generating a mesh structure based at least in part on the point cloud;
generating a texture representation of first one or more lighting characteristics associated with the mesh structure by at least delighting an object within the virtual scene; and
rendering a three-dimensional representation based at least in part on the mesh structure and the texture representation.

16. The system of claim 15, wherein the one or more images are captured using a plurality of virtual cameras having different fields of view within the virtual scene.

17. The system of claim 15, wherein the operations further comprise determining second one or more lighting characteristics associated with the mesh structure using spherical harmonics, wherein the rendering the three-dimensional representation is further based on the spherical harmonics.

18. The system of claim 15, wherein the generating the mesh structure comprises:
for a point in the point cloud:
generating a polygon that is centered around the point and is perpendicular to a normal for the point;
cutting the polygon against a neighbor point of the point in a middle of a segment connecting the point and the neighbor point to generate a cut polygon; and
triangulating the cut polygon.

19. The system of claim 15, wherein the generating the mesh structure includes:
determining a border edge on a border of a hole in the mesh structure by at least identifying at least one edge of at least one triangle in the mesh structure that does not include an adjacent edge of a neighboring triangle;
forming at least one loop comprising the border edge; and
triangulating the at least one loop.

20. The system of claim 15, wherein the one or more processing units include one or more parallel processing units, and wherein the generating the mesh structure is executed, at least in part, in parallel using the one or more parallel processing units.

* * * * *